Sept. 21, 1965   M. L. ARONOW   3,206,978

FLUID MEASURING SYSTEM

Filed July 22, 1963

INVENTOR
Martin L. Aronow
BY
*Edward M. Farrell*
ATTORNEY

United States Patent Office 3,206,978
Patented Sept. 21, 1965

3,206,978
FLUID MEASURING SYSTEM
Martin L. Aronow, Cherry Hill, N.J., assignor to Schaevitz Engineering, a corporation of New Jersey
Substituted for abandoned application Ser. No. 781,407, Dec. 18, 1958. This application July 22, 1963, Ser. No. 298,522
1 Claim. (Cl. 73—228)

This application is a substitute application for application, "Fluid Measuring System," Serial Number 781,407, filed December 18, 1958, now abandoned.

This invention relates to measuring systems, and more particularly to mass flow meters for fluid measuring systems.

Flow meters are devices or instruments which measure the rates of flow of a liquid or gaseous fluid in a conduit and which produce some indications of the rates of flow. Various different types of flow meters are presently in use. Most such flow meters involve a restriction, or primary device, in the conduit which alters the velocity of the fluid stream and produces a differential pressure. A measuring element measures the differential pressure drop. The pressure drop may be translated into flow rate readings in numerous ways.

The restrictions that produce the differential pressures may be classified into general types including orifice, nozzle, venturi and Pitot. An orifice is a hole in a thin disk that is inserted between flanges in the conduit line. A nozzle is an orifice with a flared or rounded approach section. A venturi, or venturi tube, is a fitting consisting of a "throat" preceded by a convergent section and followed by a divergent section. A Pitot, or Pitot tube, is a velocity probe that receives the full impact of the fluid stream and converts the entire velocity head into pressure head.

While such types of flow meters have proved satisfactory in most cases, there have been many instances involving critical measurements in which they have not been entirely satisfactory. For example, such types of flow meters produce much pressure drop in the conduit system since they often provide a relatively large obstacle to the fluid flow. The Pitot tube, while providing the least obstruction to fluid flow in most cases, has the disadvantage of providing an accurate measurement at only one point within the conduit and does not integrate over the entire flow area.

Another disadvantage found in many types of conventional flow meters is that resulting measurements are affected by changes in static pressure, temperature, viscosity, specific gravity and other variable factors not directly related to flow measurements. These changes tend to cause errors in the measurements relating to mass flow of the fluids involved.

In the case of Pitot tube or other measurement or control devices involving restrictions, changes in viscosity of the fluid may result in clogging of the restrictions thereby introducing errors into a system.

While various correcting means may be employed in mass flow meter devices to correct for changes in temperature and other variable factors tending to produce erroneous measurement or control signals relating to mass flow, such correcting devices add to the general complexity of the system and, in many cases, are not only undesirable but impractical. For example, in rocket fuel systems involving the mass flow of liquid oxygen to control various functions within a rocket, the measuring and control devices must be free of errors resulting from changes in static pressure or other variable factors. The mass flow meters involved in rockets, missiles and most aircraft must be relatively simple and minimize the amount of correcting equipment used, since such correcting equipment not only takes up space, but adds another possible trouble source to the system.

It is an object of this invention to provide an improved fluid mass flow meter which is relatively free of errors resulting from changes in static pressure, specific gravity, temperature or viscosity of the fluid measured in a conduit.

It is a further object of this invention to provide an improved fluid mass flow meter which does not involve an obstruction within the conduit.

It is still a further object of this invention to provide an improved mass flow meter which does not involve probes and in which a resulting measurement or control signal is a function of the entire flow within a conduit rather than from a sampling at one or more discrete points within the conduit.

It is still a further object of the invention to provide an improved mass flow meter which does not involve complex devices for correction for changes in static pressure, temperature and other variable functions not directly related to mass fluid flow.

It is still a further object of the invention to provide an improved flow meter device which quicky and accurately responds to changes in mass fluid flow and which is adaptable for use as a control device.

In accordance with the present invention, a mass flow meter is provided which is adapted to be used with a conduit having at least two sections extending in two different directions. Bellows are disposed in a member attached at the point adjacent the two divergent sections of the conduit and out of the main path of fluid flow. The bellows responds to changes in mass fluid flow. A differential transformer is associated with the bellows to convert movements of the bellows into appropriate signals for measurement or control purposes.

Other objects and advantages of the present invention will be apparent and suggest themselves to those skilled in the art to which the present invention is related, from a reading of the following specification and claims, in conjunction with the accompanying drawing, in which:

Figure 1:
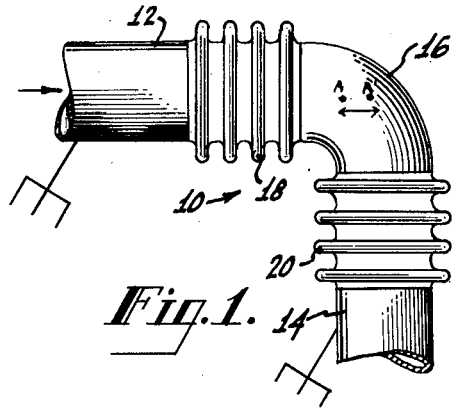
FIGURE 1 is a side view of a conduit associated with expandable members shown for the purpose of illustrating the concepts involved in the present invention.

Referring particularly to FIGURE 1, a conduit 10 includes sections 12 and 14 connected at right angles to each other by an elbow 16. An expandable member comprising a bellows 18 is connected between the section 12 and the elbow 16. A second expandable member or bellows 20 is connected between the section 14 and the elbow 16.

The bellows 18 and 20 are included in the direct path of the fluid flow within the conduit 10 and is, in fact, part of the conduit. When fluid flows through the conduit 10, the elbow 16 may be considered as being disposed at point A. When the mass fluid increases in the conduit 10, the resulting pressure change causes the bellows 18 and 20 to expand and the elbow 16 to be moved from point A to point A'. The distance moved by the elbow 16 is proportional to pressure change and a function of mass flow of the fluid passing through the conduit 10. The motion of the elbow 16 may be measured by suitable transducers.

Since the movement of the elbow 16 is dependent not only upon the mass flow of the fluid but also upon various other functions (such as static pressure) which are subject to change, the device shown is not capable of use as a mass flow meter unless additional correcting means are employed. If the effects of the elbow movement resulting from static pressure and other variable conditions are subtracted from the total effect of the elbow movement, the movement of the elbow 16 will then represent the mass flow of the fluid within the conduit 10.

Figure 2:
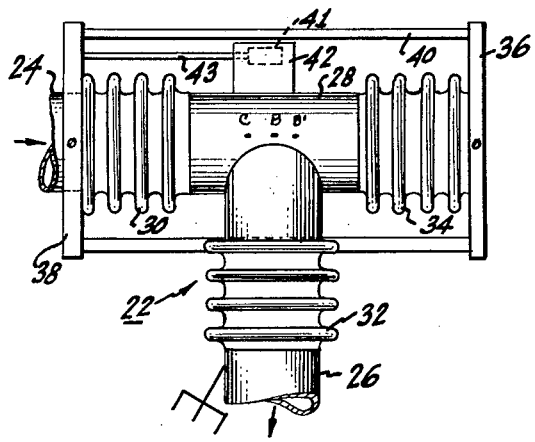
FIGURE 2 is a side view illustrating the preferred embodiment of the present invention.

Referring particularly to FIGURE 2, there is illustrated a mass flow meter that does not respond to variable functions, such as static pressure, which are not directly related to mass flow. A conduit 22 includes sections 24 and 26 connected by a "T" type fitting 28. A bellows 30, or other type of expandible member, is connected between the section 24 and the fitting 28. A second bellows 32 is connected between the section 26 and the fitting 28. Extending from the diverging points of the sections 24 and 26 is a third bellows 34, which is connected between the fitting 28 and an end member 36. The end member 36 is held in fixed relationship to a member 38, which is physically fixed to the section 24 of the conduit. A fixed linkage member 40 connects the two members 36 and 38.

Fixedly mounted on the fitting 28 is a transducer 42 for measuring the degree of movement of the fitting 28 from point B to point B' and to translate this movement into appropriate signals. The resulting signals may be used to indicate a direct measurement of fluid mass flow or to control the rate of fluid flow or some other associated function. The transducer 42 may be of the differential transformer type which includes a movable core 41 mounted in fixed relationship to the member 38 by means of a shaft or pin member 43. Such differential transformers in which an output electrical signal varies linearly with movements of the core are well known to those skilled in the art.

Consider now the operation of the mass flow meter illustrated in FIGURE 2. If we first assume that the fixed linkage member 40 is not present and the end plate 36 were free to move, it may be seen that the fitting 28 will move from points B to B' or from B to C in response to changes in both static pressure and mass flow. This is substantially the type of operation described in connection with FIGURE 1. This arrangement, as was seen, does not provide a mass flow meter which is independent of variations in static pressure, temperature of the fluid flowing and other functions not directly related to mass flow.

Consider now the operation with the fixed linkage member 40 in place and the end plate 36 maintained in a fixed physical relationship to the member 38. Under these conditions, the fitting 28 will remain at point B and not respond to changes in static pressure, temperature changes in the fluid, viscosity changes, density changes and other changes not related to mass fluid flow. The reason is that changes in static pressure, temperature, viscosity and density result in equal and opposite forces on the fitting 28. Therefore, no movement of the bellows results.

In this arrangement, however, the fitting 28 is still capable of movement in response to changes in the mass of the fluid flowing. Thus the fitting 28 may be moved from points B to C, with the movement being a function of mass flow. The degree of movement may be translated into appropriate signals by the transducer 42 for measurement or for control purposes. The movement of the fitting 28 results from changes in mass flow only since the forces relating to mass flow are not opposed by forces in opposite directions.

The operation of the invention may be described in a slightly different manner. For example, if the "T" is considered as a free body in space, the forces acting on it are in equilibrium when no fluid is flowing, regardless of the static pressure. No displacement occurs.

However, when flow around the 90° bend occurs at constant volume, additional forces act on the "T" which are functions of the mass of fluid and the acceleration which results from a change in direction of the fluid flow. These forces are resisted by tension in bellows 30 and 32 and by compression in bellows 34. The component of force and displacement, along the initial direction of flow is proportional to the mass of fluid flowing. The component of force and displacement in the transverse direction is of no interest and not measured by the transducers.

The flow meter illustrated in FIGURE 2 is essentially free from errors due to variations in the specific gravity, temperature or viscosity of the fluid flowing. It causes no obstruction in the conduit, such as orifice or venturi meters, and therefore there is little or no resulting pressure drop from this cause. The flow meter embodying the present invention has advantages over Pitot meters or other pressure probes since it integrates over the entire area rather than taking samples at one or more discrete points which might not be representative especially under turbulent conditions.

For purposes of clarity, the present invention has been described primarily in connection with conduits having sections disposed at right angles to each other. It is apparent that various different angles of conduit sections may be employed in practicing the present invention.

It is noted that most fluid systems involve conduits which have a bend. The present invention may, therefore, be incorporated into existing systems involving such bends without otherwise substantially modifying the conduit or piping arrangement involved or introducing obstructions in the path of fluid flow.

What is claimed is:

In combination with a main fixed fluid conduit having a substantially ninety degree bend therein to form at least two sections, a movable element movable with respect to said main fluid conduit included in said ninety degree bend, a bellows forming a portion of each of said sections adjacent said bend in said main fluid conduit, means for producing a signal corresponding to the mass flow of a fluid within said conduit comprising an auxiliary conduit extending from said bend in said main conduit in substantial alignment with one of said sections of said main fluid conduit, means for terminating said auxiliary conduit to prevent a continuous flow of fluid therethrough, means for maintaining the terminated end of said auxiliary conduit in fixed relationship with said main fluid conduit, a bellows included in said auxiliary conduit, said bellows being disposed to be repsonsive to movement of said movable element due to changes in mass flow of said fluid and being non-responsive to other changing characteristics of said fluid, and a differential transformer including two elements movable relative to each other to produce a variable output signal, one of said elements being connected in fixed relationship with said main conduit and the other of said elements being connected in fixed relationship with said movable element for translating movement of said last named bellows into corresponding electrical siganls.

References Cited by the Examiner

UNITED STATES PATENTS

| 2,538,785 | 1/51 | Karig | 73—228 |
| 2,605,638 | 8/52 | Pearson | 73—228 |
| 2,804,771 | 9/57 | Brown | 73—228 |
| 2,826,915 | 3/58 | Libman et al. | 73—228 |

RICHARD C. QUEISSER, *Primary Examiner.*